Patented Dec. 13, 1938

2,140,312

UNITED STATES PATENT OFFICE 2,140,312

AZO DYESTUFF

Detlef Delfs, Leverkusen-I. G. Werk, Germany, assignor to General Aniline Works, Inc., New York, N. Y., a corporation of Delaware No Drawing. Application December 2, 1936, Serial No. 113,838. In Germany December 7, 1935

5 Claims. (Cl. 260—162)

The present invention relates to watersoluble mono-azodyestuffs, more particularly it relates to azodyestuffs which may be represented by the following general formula:

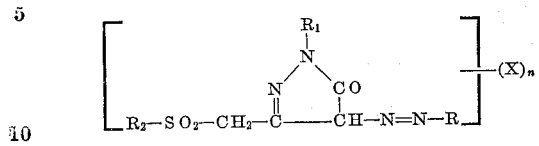

In the said formula R means the radical of a diazotization component, such as the radical of a diazotized amine of the benzene or naphthalene series, $R_1$ and $R_2$ mean hydrocarbon radicals which may bear substituents, for instance $R_1$ and $R_2$ may stand for alkyl, hydroxyalkyl, phenyl, tolyl, chlorophenyl, sulfophenyl, benzyl and the like, X means a sulfonic or carboxylic acid group, and $n$ stands for a whole number, such as 1, 2, 3. The term "radicals of the benzene series", as used herein, is not intended to include radicals derived from naphthalene, anthracene, or other condensed aromatic hydrocarbons, but is used in its generally accepted sense to indicate phenyl and substituted phenyl radicals.

My new dyestuffs are obtainable by coupling compounds of the general formula:

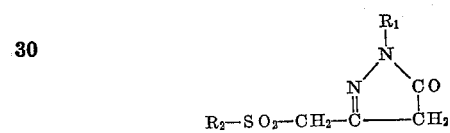

in which $R_1$ and $R_2$ mean the same as stated above, with diazo compounds, whereby the components are selected in such a manner that at least one sulfonic acid group or carboxylic acid group is present in the dyestuff molecule.

My new dyestuffs are in form of their alkali metal salts in general yellow to brown powders soluble in water dyeing the animal fiber in general yellow shades of good fastness properties.

When compared with analogously constituted pyrazolone dyestuffs, the new dyestuffs are distinguished by yielding redder shades. The dyeings obtained are very even and have a very good fastness to light.

The sulfone pyrazolones used as starting components can be produced by condensation of γ-halogen acetoacetic acid esters with sulphinic acid salts followed by converting the reaction products with hydrazines into pyrazolone derivatives, for instance γ-chloro- or γ-bromo-acetoacetic ester dissolved in methylalcohol is caused to react with the sodium salt of p-toluene sulfinic acid; the p-tolylsulfone-acetoacetic ester thus obtained is not isolated but by condensation with for instance phenylhydrazine converted into its phenylhydrazone and this is without separating converted into the 1-phenyl-3-p-tolylsulfonemethyl-5-pyrazolone by treatment with sodium hydroxide solution.

The invention is illustrated by the following examples (the parts being by weight):

Example 1

252 parts of 1-phenyl-3-methylsulfonemethyl-5-pyrazolone are stirred into 5000 parts of water with 250 parts of sodium carbonate. To this solution the suspension of the diazo compound of 222 parts of 3-chloro-2-amino-1-methylbenzene-5-sulfonic acid is slowly added at 0–5° C. Coupling is quickly complete. The dyestuff which corresponds in its free state to the following formula:

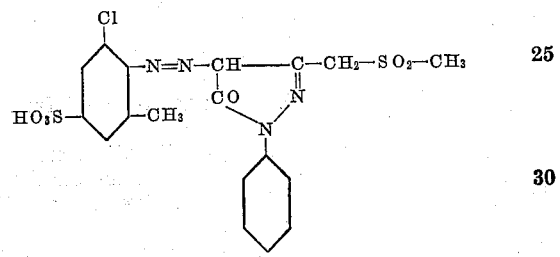

isolated in the usual manner, is distinguished by very good equalizing power. It dyes wool in an acid bath reddish yellow shades of good fastness properties.

When the 3-chloro-2-amino-1-methylbenzene-5-sulfonic acid is substituted by the corresponding quantity of other amino acids, as for example the aniline-3-sulfonic acid or the 2-chloroaniline-5-sulfonic acid, similar results are obtained.

When in the above dyestuffs the 1-phenyl-3-methylsulfonemethyl-5-pyrazolone is substituted by the 1-phenyl-3-ethylsulfonemethyl-5-pyrazolone there are obtained dyestuffs which in part are distinguished by an improved fastness to washing.

Example 2

328 parts of 1-phenyl-3-p-tolylsulfonemethyl-5-pyrazolone are coupled with 208 parts of diazotized 2-chloraniline-5-sulfonic acid in the manner described in Example 1. There is obtained a dyestuff which corresponds in its free state to the following formula:

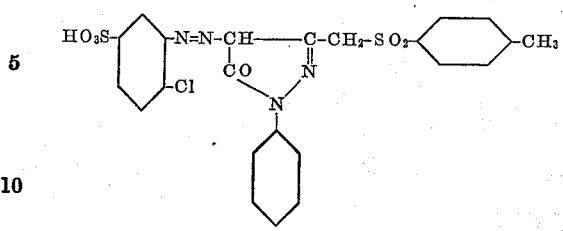

dyeing wool reddish yellow shades of good fastness properties.

When the 2-chloraniline-5-sulfonic acid is substituted by the corresponding quantity of 3-chloro-2-amino-1-methylbenzene-5-sulfonic acid or m-aminobenzenesulfonic acid, dyestuffs of similar properties are obtained.

A reddish yellow is obtained when coupling the pyrazolone mentioned in paragraph 1 with diazotized 2-naphthylamine-8-sulfonic acid.

The use of the 1(3'-sulfophenyl)-3-p-tolyl-sulfonenemethyl-5-pyrazolone instead of the 1-phenyl-3-p-tolylsulfonemethyl-5-pyrazolone in the combinations of the preceding paragraphs of the example yields dyestuffs of an increased solubility in water.

*Example 3*

217 parts of the diazo compound of the 2-aminobenzoic acid-5-sulfonic acid are coupled with 328 parts 1-phenyl-3-p-tolyl-sulfonemethyl-5-pyrazolone in the manner described in Example 1. There is obtained a dyestuff which corresponds in its free state to the following formula:

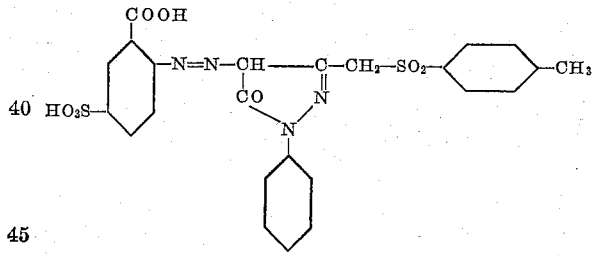

which dyes wool yellow shades of good fastness properties.

When coupling the same diazotization component with 1-phenyl-3-phenylsulfonemethyl-5-pyrazolone there is obtained a dyestuff exerting nearly the same properties.

By forming the chromium complex compound dyeings of a remarkably improved fastness to washing and fulling are obtained.

I claim:

1. Watersoluble monoazodyestuffs having in the free state the following general formula:

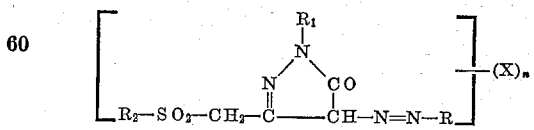

wherein R means the radical of a diazotization component, $R_1$ and $R_2$ mean members selected from the group consisting of lower aliphatic saturated hydrocarbon radicals, radicals of the benzene series and hydroxy-, alkoxy-, aryloxy-, sulfonic acid-, carboxylic acid-, amino-, alkylamino-, acylamino-, nitro- and halogen-substitution products of the radicals of the benzene series, X means a member selected from the group consisting of the sulfonic acid group and the carboxylic acid group, and $n$ means a whole number, being in form of their alkali metal salts in general yellow to brown powders, dyeing the animal fiber in general yellow shades of good fastness properties.

2. Watersoluble monoazodyestuffs having in the free state the following general formula:

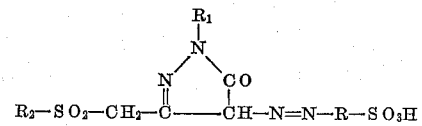

wherein R stands for a radical of the benzene series, $R_1$ and $R_2$ stand for members selected from the group consisting of lower aliphatic saturated hydrocarbon radicals, radicals of the benzene series and hydroxy-, alkoxy-, aryloxy-, sulfonic acid-, carboxylic acid-, amino-, alkylamino-, acylamino-, nitro- and hologen-substitution products of the radicals of the benzene series, being in form of their alkali metal salts in general yellow to brown powders, dyeing the animal fiber in general yellow shades of good fastness properties.

3. Watersoluble monoazodyestuffs of the formula:

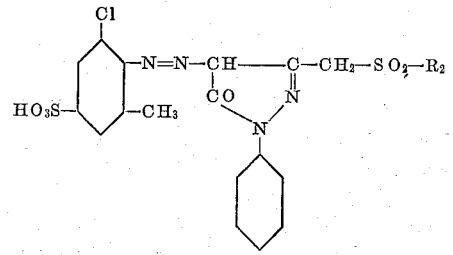

wherein $R_2$ stands for a radical selected from the group consisting of lower aliphatic saturated hydrocarbon radicals and radicals of the benzene series, dyeing wool in general reddish yellow shades of good fastness properties.

4. The watersoluble monoazodyestuff of the formula:

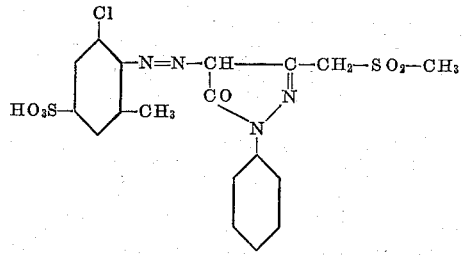

dyeing wool reddish yellow shades of good fastness properties.

5. The watersoluble monoazodyestuff of the formula:

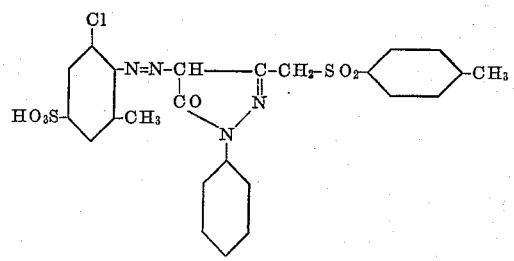

dyeing wool yellow shades of good fastness properties.

DETLEF DELFS.